June 15, 1965 A. FRANCK ETAL 3,189,749

MAGNETIC BISTABLE CIRCUIT

Filed Jan. 4, 1960

INVENTORS
ABRAHAM FRANCK
ARTHUR V. POHM

BY Cushman, Darby & Cushman
ATTORNEYS

United States Patent Office 3,189,749
Patented June 15, 1965

3,189,749
MAGNETIC BISTABLE CIRCUIT

Abraham Franck, Minneapolis, Minn., and Arthur V. Pohm, Ames, Iowa, assignors to Sperry Rand Corporation, New York, N.Y., a corporation of Delaware Filed Jan. 4, 1960, Ser. No. 384
21 Claims. (Cl. 307—88)

This invention relates generally to magnetic switching apparatus of the bistable circuit type useful for example in digital computing machines, and more specifically to a novel scale-of-two counting stage or flip-flop which utilizes the anisotropic properties of certain magnetic elements to obtain a circuit having two stable states of potential.

A basic component of electronic data handling systems is the flip-flop circuit or bistable multivibrator which can be switched alternately between its two conditions of stable equilibrium by means of trigger pulses. If the switching is accomplished by pulses arriving from a single trigger input, the flip-flop becomes a scale-of-two or radix two counter stage and as such is usable as a building block in electronic data handling equipment.

In the past, vacuum tubes and transistors have been widely used in various circuit arrangements to implement a binary counting stage. In most of these circuit configurations a continuous dissipation of power is inherent in the circuit since a current flow is required to maintain said circuits in one of its two possible stable states. The present invention obviates this waste of power since in this circuit power is dissipated only during the extremely short interval in which the flip-flop is being switched from one state to another.

Briefly, this invention, in one embodiment, includes a core of ferromagnetic material having two center-tapped windings inductively coupled to the preferred or "easy" axis of magnetization of said core. A third winding termed the input or trigger winding is coupled to the core such that, when a current is made to flow therethrough, the resulting magnetic field acts in a direction transverse to said easy axis of the core. The first center tapped winding is coupled at opposite ends to the base electrodes of two transistors each having their emitters grounded. This center tap is grounded and the second center-tapped winding is coupled at opposite ends to the collector electrode of the transistors with said second center tap being connected to a suitable D.C. supply. Because of the inductive coupling in the core, a current in the third winding causes only one of the two transistors to conduct. The increased conduction of this transistor causes more current to flow from the grounded emitter of the conducting transistor to the D.C. supply, and hence provides a blocking oscillator type action or run away condition with the core until saturation of the core is reached. By applying recurrent trigger input current pulses to the input winding the core switches alternately between opposite states of magnetic saturation. The direction of switching being solely dependent on the direction of residual magnetization of the core and independent of the polarity of the input current or time of application, this device forms a scale-of-two counter.

It is accordingly an object of the present invention to provide a new and improved magnetic bistable circuit for use in electronic switching and counting operations.

Another object of the invention is to provide a scale-of-two counter utilizing only two transistors and a single magnetic core element.

Still another object of this invention is to provide a magnetic bistable circuit which consumes power only during the interval it is being switched.

A further object of this invention is to provide a relatively high speed magnetic bistable circuit which is limited only by the switching rate of the magnetic core used.

Additional objects and advantages of this invention, together with its construction and mode of operation, will be more apparent from the following description when read in connection with the accompanying drawings in which:

FIGURES 2A through 2E illustrate vectorially the various fields effecting the operation of the circuit of FIGURE 1.

Figures 1, 2, 3:
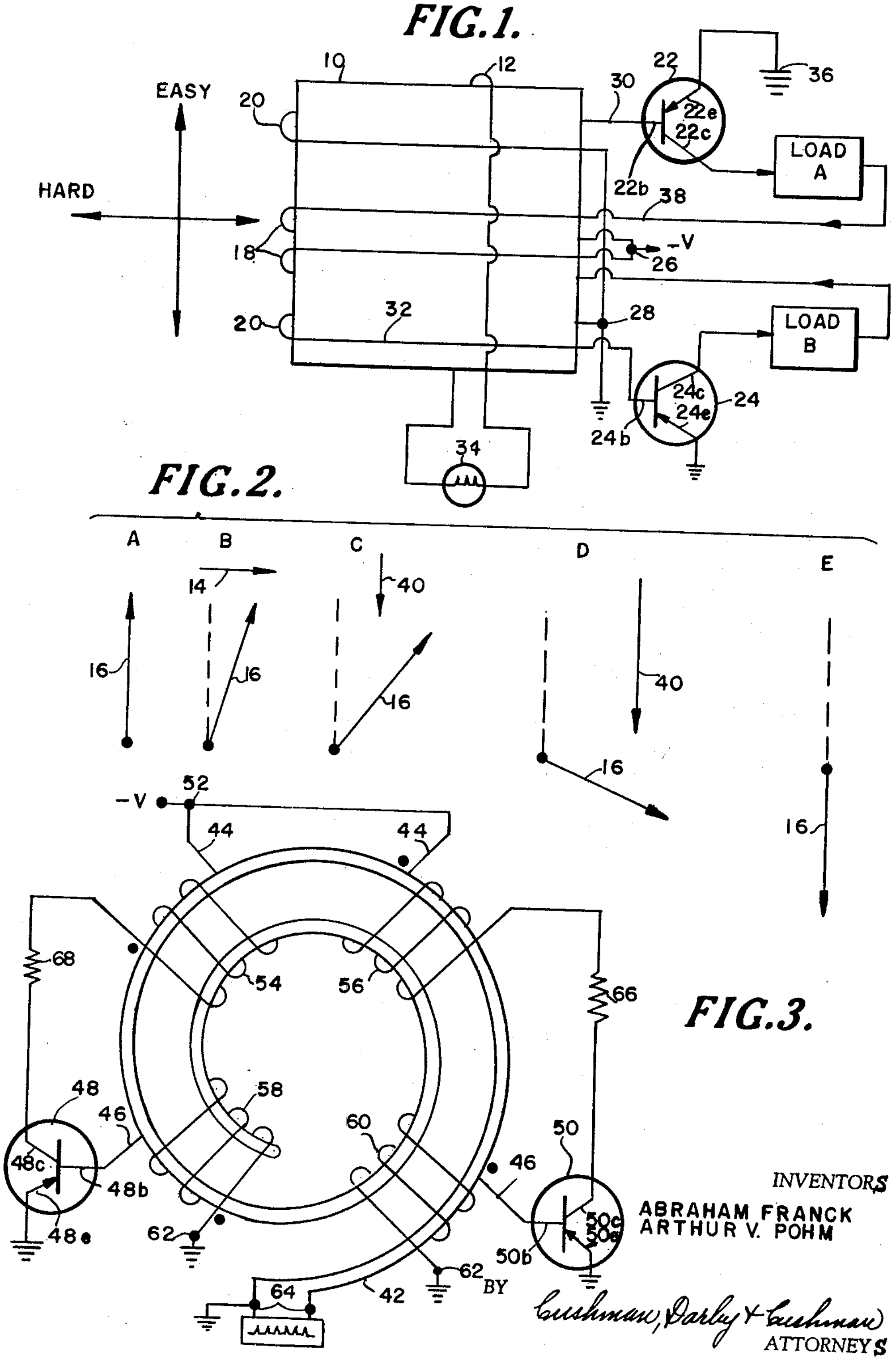
FIGURE 1 illustrates one embodiment utilizing a thin ferromagnetic film as the magnetic core element.
FIGURE 3 illustrates another embodiment utilizing a tape wound toroidal type core as the magnetic element.

Reference is first made to FIGURE 1 in which is shown a thin film type magnetic core 10. Core 10 may be of the type prepared by vacuum deposition in an orienting magnetic field in accordance with the Rubens Patent No. 2,900,282, and has uniaxial anisotropy with two mutually perpendicular axes of remanent magnetization both fully within the plane of the film. The axis which was aligned with the orienting field during the deposition process is termed the "preferred" or "easy" axis of the film, and when the film is saturated by a field parallel to this axis, it exhibits a high degree of remanent magnetization when the saturating field is removed. The axis which is perpendicular to the easy axis is termed the "hard" or "difficult" axis of magnetization and when the core is operated by fields applied parallel to this axis the core exhibits a hysteresis loop similar to that of a highly efficient transformer. The remanent magnetization in such films is rotatable from either of its stable state positions along the easy axis to the other.

An input winding 12 is wound on core 10 such that the field produced by current flowing therethrough acts in a direction parallel to the hard axis of the core. This field is indicated by vector 14 of FIGURE 2B. A current pulse applied to winding 12 causes the remanent magnetization indicated by vector 16 to rotate, clockwise or counterclockwise in accordance with the state of the core, toward the hard axis from its initial position in alignment with the easy axis. This rotation, in turn, causes a voltage signal to be induced in all windings inductively coupled to the easy axis of the core 10.

In FIGURE 1 the windings which have signals induced therein due to the rotation of the films magnetization are the two center tapped windings 18 and 20. It should be noted that these windings though inductively coupled to the easy axis are actually physically arranged parallel to the difficult axis of magnetization. Windings 18 and 20 are coupled to a push-pull arrangement to a pair of current generators such as transistors 22 and 24. Winding 18 which has its center tap 26 connected to a suitable source of negative potential −V, is connected at its opposite ends to the collector terminals **22*c* and 24*c* of transistors 22 and 24, respectively via load A and load B. Winding 20 which has its center tap 28 at ground potential is brought out at opposite ends to the base electrodes 22*b* and 24*b* of transistor 22 and 24. Transistors 22 and 24 are illustrated as being of the PNP type but it should be understood that NPN transistors may be utilized if the D.C. collector supply voltage connected to terminal 26** is positive in potential instead of negative.

Because of the push-pull configuration, the signal induced in the upper half 30 of winding 20 will be of one polarity whereas the signal induced in the lower half 32 of winding 20 will be of the exactly opposite polarity when the magnetization of the core is rotated by the application of a trigger pulse from source 34 to winding 12. Assume that core 10 is initially in its state of remanent magnetization (such as indicated by vector 16 of FIGURE 2A) which will cause a negative signal to be induced in the upper half 30 of winding 20 and a positive signal in the lower half 32 when its magnetization is rotated by the action of an input pulse. Transistor 22 will therefore become more conductive whereas transistor 24 will be driven further into its current cutoff region. With the conductance of transistor 22 increased, an increased amount of current will flow from ground 36 through the emitter to collector circuit of transistor 22 and from there through the upper half 38 of winding 18 to the negative potential —V connected at center tap 26. This increase in current flow through winding 38 sets up a field antiparallel to the easy axis of film 10 which applies a further torque on the magnetization of said film thereby urging it to rotate further in the same direction. This field is indicated by vector 40 in FIGURE 2. The further rotation, in turn, induces a signal in winding 30 tending to drive transistor 22 further into its conducting region. It can be seen that the effect is similar to that found in a blocking oscillator in that there is a cumulative buildup of switching field (represented by the increasing magnitude of vector 40 in FIGURES 2C, D) until the core is driven into the opposite state of magnetic saturation from which it started. When the film reaches a saturated state opposite from the state from which it started as indicated by vector 16 of FIGURE 2E, the coupling between the winding 30 and the film becomes very small because of the low permeability of the core material and hence the runaway condition ceases. Both transistors are therefore left in their cutoff state since their base and emitter electrodes are at substantially the same potential (ground in the illustrated case).

When the next trigger pulse is applied to winding 12 a negative signal will be induced in the lower half 32 of winding 20 while a positive signal will be induced in the upper half 30 of winding 20. This is due to the fact that the trigger pulse from source 34 sets up a field perpendicular to the direction of remanent magnetization and causes a field to be induced in winding 20. The direction of this rotation produced by the present trigger pulse is exactly opposite to that produced by the preceding trigger pulse and hence the polarities of the signals applied to the base terminals of transistors 22 and 24 are reversed from that of the previous case.

Since a negative pulse is applied to base 24*b*, transistor 24 will become more conductive whereas transistor 22 will be cutoff by a greater amount. An increase in current flow therefore results between the emitter and collector terminals of transistor 24 and as before this increase of current results in an increase in the longitudinal field produced by winding 32. The blocking oscillator type action again takes place until the magnetization of film 10 is again completely rotated and saturation achieved in the same direction as existed prior to the application of the previous trigger pulse (see FIGURE 2A).

To couple a plurality of these bistable devices together to provide a counter of modulus $2^n-1$, the input winding 12 of the other identical stages should be coupled in as either load A or load B.

FIGURE 3 illustrates a second embodiment of this invention wherein a so-called "tape wound" core 42 is used in place of the thin film type core of FIGURE 1. Core 42 may be of the type which has one end terminating on the inside of the core and the other on the periphery of the core, or, as shown in FIGURE 3 of the type which has a double wrap folded back on itself with both ends 64 terminating on the core periphery. For example, and without limitation thereto, core 42 may be a two turn contrawound 4–79 moly-permalloy tape toroidal core 0.1 inch in diameter and 1/32 inch wide. Cores of this type also exhibit a preferred or easy axis of magnetization which is along the length of the tape running parallel to the rolling lines resulting in said tape during its manufacture. When a current is made to flow lengthwise in the ribbon core an internal transverse field is established in the tape which acts in a direction perpendicular to the easy axis of the core. This transverse field then causes a rotation of the remanent magnetization which then induces signals in windings distributed about the core periphery.

As in the circuit of FIGURE 1, the circuit of FIGURE 3 is provided with a pair of center tapped windings 44 and 46. These windings are connected in a push-pull arrangement with a pair of grounded emitter current generating transistor amplifiers 48 and 50. Split winding 44 which has its center tap 52 connected to a suitable D.C. supply (+V for NPN transistors or —V for the PNP transistors shown) has one half thereof 54 brought out to the collector terminal 48*c* of transistor 48, and the other half thereof 56 brought out to the collector terminal 50*c* of transistor 50.

In an analogous manner each half 58 and 60 of the center tapped winding 46 is connected to the base terminal of transistors 48*b* and 50*b* of transistors 48 and 50 respectively. The center tap 62 of winding 46 is at ground potential.

When an input trigger current pulse of a predetermined magnitude is applied to the trigger input terminals 64, a current flows lengthwise through the ribbon forming core 42 and, as mentioned above, establishes a field transverse to the easy axis of magnetization of the core. This field produces a torque on the remanent magnetization tending to produce a rotation thereof. This rotation of the magnetization induces signals in the windings 44 and 46 inductively coupled to the easy axis of the core.

Depending on the initial state of remanence of the core, the signal induced in winding half 58 will be either positive or negative. Because of the push-pull arrangement of winding 46 the signal induced in winding half 60 will always be opposite in polarity to the signal induced in winding half 58.

Assuming that core 42 was initially magnetized such that the signal produced by the rotation of the remanent magnetization by the input trigger pulse is negative in winding half 58, the signal applied to terminal 50*b* of transistor 50 will be positive in polarity. This positive signal applied to the base of transistor 50 drives that transistor further into the current cutoff region of its characteristics. The negative pulse applied to terminal 48*b* of transistor amplifier 48, however renders this transistor more conductive such that current begins to flow from the grounded emitter of transistor 48 through winding half 54 and from there to the D.C. source at terminal 52.

The current flow through winding half 54 produces a magnetic field which acts anti-parallel to the remanent magnetization and hence tends to increase the torque on the remanent magnetization. The increased torque results in a further rotation of the remanent magnetization, which in turn renders the base electrode of transistor 48 more negative. The more negative that base 48*b* is made the more conductive this transistor becomes. As transistor 48 becomes more conductive, more current flows through winding half 54. It can be seen that a condition of instability exists, and hence the remanent magnetization will be rotated until the opposite state of saturation is reached. As mentioned previously, when the core reaches a saturated state, the coupling between the core and the windings becomes very small due to the low permeability of the core material in the saturated region so that the current runaway condition is brought to a halt.

When the next input pulse is received at terminals 64, the initial rotation of the magnetization will be in such a direction as to induce a signal which further cuts off transistor 48 and renders transistor 50 slightly conducting. The conduction of transistor 50 allows a limited current to flow through winding half 56 which produces a field anti-parallel to the remanent magnetization. This latter field aids the rotation of the magnetization and hence causes a more negative signal to be applied to the base of transistor 50. Transistor 50 thus conducts more heavily, allowing an increase in current flow through winding half 56. This blocking oscillator type action thus continues until the core becomes saturated in its initial state prior to the application of the first input trigger pulse.

In an exemplary embodiment, the four winding halves may consist of twenty turns each for the tape core described above. Also the transistors employed may be type 2N393. With these values, the collector voltage source may be −3 volts. With this particular configuration and component values, a trigger pulse of 600 ma. peak amplitude and 0.1 microsecond in duration is capable of switching the flip-flop.

Again, the circuit of FIGURE 3 may be used as one element of a binary counter, the complete counter or modulus $2^n-1$ being formed by connecting identical circuits together with the input to the second stage obtained from the voltage drop across one of the collector load resistors 66 or 68.

Thus it is apparent that there is provided by this invention systems in which the various objects and advantages herein set forth are successfully achieved.

Modifications of this invention now described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Magnetic switching apparatus comprising an anisotropic magnetic element having an easy axis of magnetization along which the remanent magnetization may lie in either of two directions representing two stable states and a difficult axis of magnetization oriented at an angle with said easy axis, both axes being fully within the element and said remanent magnetization being rotatable from either of its stable state directions to the other, means for applying to said element a magnetic field parallel to said difficult axis to cause rotation of the remanent magnetization from the easy axis toward the difficult axis, and means responsive to said rotation for effecting a magnetic field antiparallel to the direction the remanent magnetization was before said rotation to cause the rotated remanent magnetization to rotate further toward and to its opposite stable state.

2. Apparatus as in claim 1 wherein the easy and difficult axes in said magnetic element are substantially perpendicular to one another.

3. Apparatus as in claim 1 wherein the rotation responsive means includes two windings and a current generating means interconnecting the two windings, the arrangement being such that rotation of the remanent magnetization induces a signal in one of said windings which signal energizes the current generating means to cause a current to flow in the other of said two windings for producing said antiparallel field.

4. Magnetic switching apparatus comprising an anisotropic magnetic element having an easy axis of magnetization along which the remanent magnetization of the element may lie in either of two directions representing two stable states and a difficult axis of magnetization perpendicular to said easy axis, both axes being fully in the magnetic element and said remanent magnetization being rotatable from either of its stable state directions to the other, means for applying to said element a field parallel to the difficult axis to cause rotation of the remanent magnetization from its initial direction along said easy axis toward the difficult axis, means for sensing said rotation and producing an output signal, and means responsive to said output signal for generating a magnetic field antiparallel to said initial direction of the remanent magnetization to cause the rotated remanent magnetization to rotate further and to its opposite stable state.

5. Apparatus as in claim 4 wherein said sensing means includes a winding in inductive relation with the magnetic element, and wherein the means for generating said antiparallel field includes a second winding having conductors oriented substantially perpendicular to the easy axis.

6. Apparatus as in claim 5 wherein the antiparallel field generating means further includes means responsive to said output signal for producing a current for said second winding to effect the antiparallel field.

7. Apparatus as in claim 6 wherein said magnetic element is a thin magnetic film.

8. Apparatus as in claim 6 wherein said magnetic element is a wrapped core.

9. Apparatus as in claim 8 wherein the core is of the double wrap type wherein the ends of the core are on the periphery of the core.

10. Apparatus as in claim 8 wherein the means for applying a field along the difficult axis includes means for causing a current to flow in the core parallel to the easy axis.

11. Apparatus for changing the state of a magnetic element comprising an anisotropic magnetic element having an easy axis of magnetization along which the remanent magnetization may lie in either of two directions representing two stable remanent magnetization states and a difficult axis of magnetization oriented at an angle to said easy axis, both axes being fully in the magnetic element and the remanent magnetization being rotatable from either of its states to the other, means for applying to the element a magnetic field parallel to said difficult axis to cause the remanent magnetization to rotate from its initial direction along said easy axis clockwise or anticlockwise in accordance with the state of the element and toward the difficult axis, means for sensing the direction of such remanent magnetization rotation, and means responsive to the sensed rotation direction for applying to the element a magnetic field along said easy axis antiparallel to the initial remanent magnetization direction regardless of which state the remanent magnetization was initially in.

12. Apparatus as in claim 11 wherein the easy and difficult axes are substantially perpendicular to one another.

13. Apparatus as in claim 11 wherein the magnetic element is a thin magnetic film, and wherein the means for applying the field along the difficult axis includes a conductor physically substantially parallel to the easy axis.

14. Apparatus as in claim 11 wherein the magnetic element is a wrapped core, and wherein the means for causing a field parallel to the difficult axis includes means for passing a current through the core in a direction parallel to the easy axis.

15. Apparatus as in claim 11 wherein the last mentioned means includes a center-tapped winding having conductors substantially parallel to said difficult axis, two current generating means respectively coupled at their outputs to the ends of said winding and respectively responsive to the different directions of rotation of the remanent magnetization to generate current in their associated winding halves.

16. Apparatus as in claim 15 wherein the means for sensing the direction of rotation of the remanent magnetization includes a second center-tapped winding coupled at its opposite ends respectively to the inputs of said current generating means.

17. Apparatus as in claim 16 wherein the conductors of said second winding are substantially parallel to said difficult axis.

18. A magnetic flip-flop comprising an anisotropic magnetic element having an easy axis along which the remanent magnetization may lie in either direction representing two stable magnetic states and a difficult axis substantially perpendicular to said easy axis, both axes being in said element and the remanent magnetization being rotatable from either of its stable state positions to the other, means including a source of input pulses of either polarity for causing a field in the magnetic element along said difficult axis to cause the remanent magnetization to rotate in a clockwise or anticlockwise direction according to the state of the element, a first winding having conductors physically oriented substantially parallel with said difficult axis and having a midpoint connected to a reference potential to form two first winding sections which respectively have induced therein due to the rotation of the remanent magnetization a positive going signal and negative going signal, the polarity of the induced signal in either of said winding sections being dependent upon the state of the element, two current generators respectively coupled at their inputs to the two winding sections, a second winding having conductors physically oriented substantially parallel with said difficult axis and a midpoint connected to a predetermined potential forming two second winding sections, and means coupling the outputs of said current generating means respectively to said two second winding sections, each of said generating means being responsive to like polarity output signals from the two first winding sections so that only one of the current generating means is operative at a time to provide to its associated second winding section a current for producing a field antiparallel to the initial remanent magnetization to cause the remanent magnetization to rotate further and to its opposite stable state, the arrangement being such that the element changes state once per input pulse regardless of its polarity due to an increasing field along the easy axis as generated by cumulative action due to the continuous sensing of the rotation of the remanent magnetization by said first winding.

19. Apparatus as in claim 18 wherein said current generating means are transistors of like type.

20. Apparatus as in claim 18 wherein the magnetic element is a thin magnetic film, and wherein the difficult axis field causing means includes a conductor in inductive relation with the film and physically oriented substantially parallel to the easy axis.

21. Apparatus as in claim 18 wherein the magnetic element is a double wrapped core having its opposite ends on the periphery of the core, and wherein the difficult axis field causing means includes means for causing current to flow through the core in a direction substantially parallel to the easy axis thereof.

References Cited by the Examiner

UNITED STATES PATENTS

| | | | |
|---|---|---|---|
| 2,883,604 | 4/59 | Mortimer | 340—174 |
| 2,916,729 | 12/59 | Paull | 307—88 |
| 2,939,115 | 5/60 | Bobeck | 340—174 |

OTHER REFERENCES

Communications Electronics, January 1954, pp. 822–830, #31.

S. M. Rubens: "Effect of Tranverse Field, etc.," Journal of Applied Physics, vol. 29, No. 8, August 1958, pp. 1245–1247.

A. U. Pohm: "A Compact Coincident-Current Memory," Proceedings of The Eastern Joint Computer Conference, Dec. 10–12, 1956, pp. 120–123.

IRVING L. SRAGOW, *Primary Examiner.*

JOHN F. BURNS, *Examiner.*